United States Patent
Inoue et al.

(12)

(10) Patent No.: US 6,375,852 B1
(45) Date of Patent: Apr. 23, 2002

(54) CALIX [4] ARENE POLYMER, METHOD OF MANUFACTURING THE SAME AND METHOD OF SEPARATING DIVALENT LEAD ION BY USE OF THE SAME

(75) Inventors: Katsutoshi Inoue; Keisuke Ohto; Shinya Wakisaka, all of Saga; Takaaki Shinohara, Chikugo, all of (JP)

(73) Assignee: Saga University, Saga (JP)

( * ) Notice: Subject to any disclaimer, the term of this patent is extended or adjusted under 35 U.S.C. 154(b) by 0 days.

(21) Appl. No.: 09/552,721

(22) Filed: Apr. 19, 2000

(30) Foreign Application Priority Data

Jun. 11, 1999 (JP) .............................. 11-165219

(51) Int. Cl.$^7$ ................................. C02F 1/28
(52) U.S. Cl. ........................ 210/688; 528/176
(58) Field of Search ................ 210/688, 912; 502/402; 568/633; 528/176, 179, 271, 397, 425, 486, 495

(56) References Cited

U.S. PATENT DOCUMENTS

| | | | | |
|---|---|---|---|---|
| 5,210,216 A | * | 5/1993 | Harris et al. ............... | 548/518 |
| 5,688,998 A | * | 11/1997 | Ichimura et al. ............ | 568/633 |
| 5,926,687 A | * | 7/1999 | Dozol et al. ............... | 210/681 |
| 6,040,462 A | * | 3/2000 | Oh et al. ................. | 549/352 |

FOREIGN PATENT DOCUMENTS

| | | |
|---|---|---|
| JP | 5-264531 | 10/1993 |
| JP | 6-58920 | 3/1994 |
| JP | 11-70383 | 3/1999 |

* cited by examiner

*Primary Examiner*—Ivars Cintins
(74) *Attorney, Agent, or Firm*—Sughrue Mion, PLLC

(57) ABSTRACT

This invention relates to an adsorbent made up of calix [4] arene polymer having a repeating unit, a method of separating divalent lead ions shown by the following chemical formula and a method of manufacturing the same.

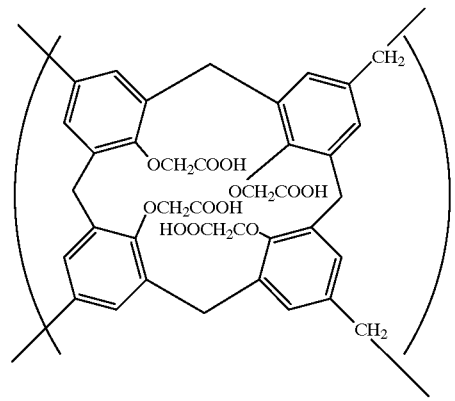

3 Claims, 5 Drawing Sheets

CALIX [4] ARENE POLYMER, METHOD OF MANUFACTURING THE SAME AND METHOD OF SEPARATING DIVALENT LEAD ION BY USE OF THE SAME

FIELD OF THE INVENTION

This invention relates to a technique of polymerizing calixarene tetramer (as referred to calix [4] arene), and a technique of selectively separating divalent lead ions from an aqueous solution containing a variety of ions by forming an inclusion compound composed of the calix [4] arene polymer and the lead ions included therein.

BACKGROUND OF THE INVENTION

A technique of separating lead ions from ions other then the lead ions is very important in order to remove harmful metals from environment and to remove impure metals in manufacturing a highly pure metal used for electric and electronic materials.

Meanwhile, calixarene compounds have been noted as the third big cyclic inclusion compound next to cyclodextrin and crown ether on account of their faculties for recognition and separation of molecules or ions since Gutsche et. al. in U.S. developed a method of synthesizing them at a low cost in 1978.

However, because the compounds have a low solubility in an organic solvent, it is not suitable to use them as an extracting medium for solvent extraction.

Therefore, it is practical to use the compounds as an adsorbent or separating membrane in the solid state in order to selectively recognizing and separating a trace amount of specific substances.

Thus, there is a technique of separating optical isomers in a chromatography in which adsorbents are made up of a variety of calixarene compounds fixed on water-insoluble supports such as glycidyl methacrylate (see: Showa Denko K. K., JP-A-6-58920 and JP-A-5-264531).

However, since in the above technique a rate of a functional group in the calixarene is only 20 mmol per kg of dried adsorbent, it is too low to use it as the adsorbent of metal ions.

Meanwhile, the inventors have developed a method of fixing calixarene carboxylic acid derivatives on polyallylamine and a method of adsorbing and separating divalent lead ions using the same (see: JP-A-11-70383).

SUMMARY OF THE INVENTION

However, the developed adsorbent may adsorb metal ions other then divalent lead ions depending on treatment conditions because of the presence of remaining primary and secondary amines in the adsorbent. Further, since its exchange capacity for lead ions is only several hundreds mmol per kg of the dried adsorbent, it is desired to increase the capacity.

An object of the invention is, therefore, to develop an adsorbent having a excellent selectivity for divalent lead ions, an easy preparation, and a low cost and whereby to provide a technique of more efficiently separating, removing and recovering the lead ions from an aqueous solution containing the lead ions.

As a result of the inventors' hard study for the purpose of attaining the above object, the inventors have found a new method of polymerizing or resinifing calixarene and further have found that the polymerized or resinified compound has a high selectivity for the divalent lead ions, and accomplished the invention.

Thus, the present invention has the following construction.

(1) A calix [4] arene polymer according to the present invention has a repeating unit shown by the following chemical formula.

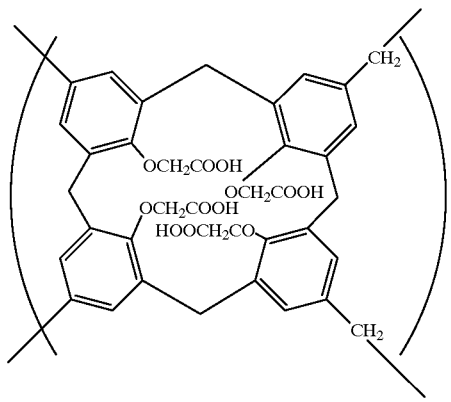

An unbonding hand in the formula combines with other calix [4] arene being the repeating unit and benzene rings thereof combine with each other through a methylene group to construct a network. Besides, the number of the repeating unit is preferably 10–1000.

(2) An adsorbent according to the present invention is characterized by being composed of the aforementioned calix [4] arene polymer.

(3) An inclusion compound according to the present invention is characterized by composed of the aforementioned calix [4] arene polymer and divalent lead ions included therein.

(4) A method of manufacturing the aforementioned calix [4] arene polymer according to the present invention is characterized by comprising the steps of mixing calix [4] arene shown by the following chemical formula, trioxane and acetic acid to stir them under heating, adding a mixture of sulfuric acid and acetic acid thereto to further stir them under heating, and after cooling it, precipitating a product by adding sodium hydrogencarbonate thereinto

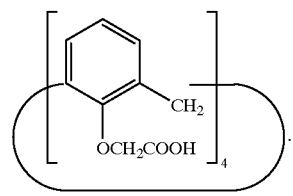

(5) A method of separating divalent lead ion according to the present invention is characterized by using the aforementioned calix [4] arene polymer as an adsorbent for divalent lead ions.

In a practical adsorbing procedure, a batch process can be conducted in which a predetermined amount of an adsorption gel made up of the polymer according to the present invention is placed into a tank together with an aqueous solution to be treated, to adsorb divalent lead ions under stirring, and then the gel is separated by filtrating. Alternatively, a continuous process can be conducted in which an adsorbent made up of the polymer according to the present invention is packed into a column and an aqueous solution to be treated is passed through the column to adsorb divalent lead ions.

After the lead ions are removed, the aqueous solution can be released to environment, or further can be treated to recover useful metal ions, if contained.

On the other hand, the lead can be recovered at a high purity and concentration by contacting the adsorbent adsorbing the lead with, for example, an aqueous solution of concentrated nitric acid.

BRIEF DESCRIPTION OF THE DRAWINGS

The present invention will be described with reference to the accompanying drawings, wherein.

DESCRIPTION OF THE PREFERRED EMBODIMENT

Figure 1:
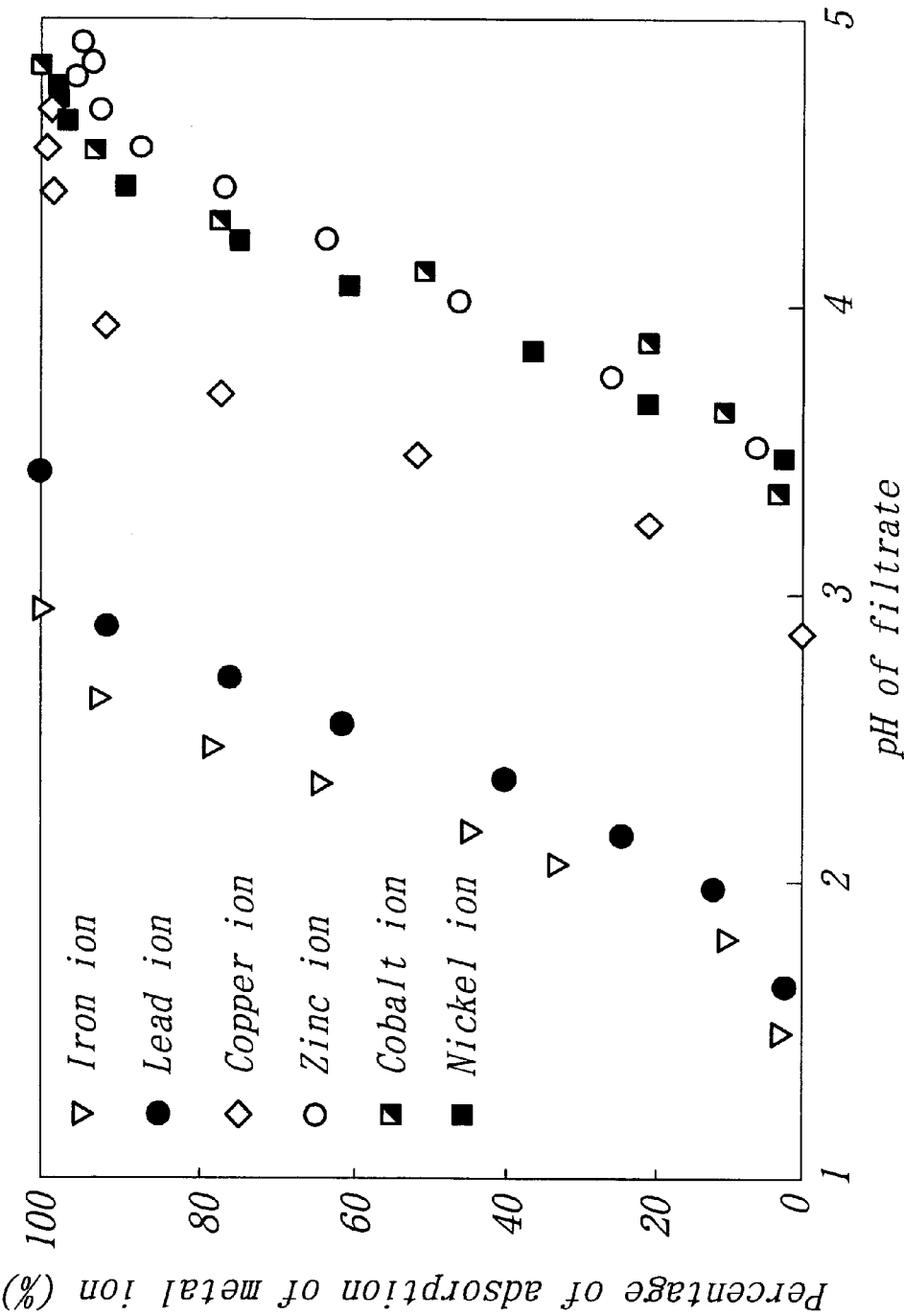
FIG. 1 is a graph showing a relation between a percentage of adsorption of each kind of metal ion and a pH value of a filtrate.

The present invention will be explained more concretely below.

EXAMPLE 1

A method of manufacturing a polymer according to the present invention having a repeating unit of calix [4] arene will be shown below. This polymer has carboxyl groups inside an inclusion portion (pore portion).

Each of four phenolic hydroxyl groups in a commercially available calix [4] arene which is shown by a chemical formula at left end in the following reaction formula is converted to a functional group of ethyl acetate by reacting with ethyl bromoacetate according to a usual manner.

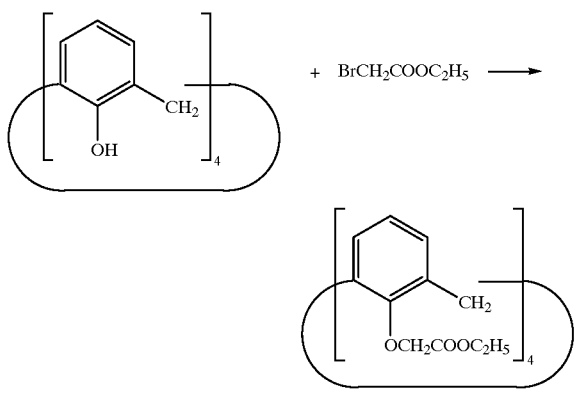

Next, an ester portion of the obtained compound is hydrolyzed by being reacted with potassium hydroxide in tetrahydrofuran (THF) to be converted to a carboxyl group as shown in the following reaction formula according to a usual manner and 25, 26, 27, 28-tetrakis (carboxymethoxy) calix [4] arene is obtained.

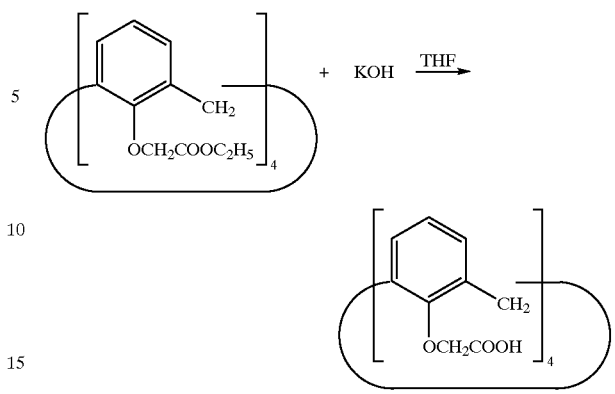

And then, the obtained calix [4] arene is reacted with trioxane to obtain an objective calix [4] arene polymer according to the present invention as shown in the following reaction formula.

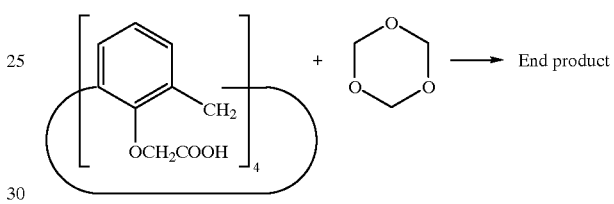

In a detail explanation of the above reaction, 5 g of 25, 26, 27, 28-tetrakis (carboxymethoxy) calix [4] arene, 3.7 g of trioxane, and 30 g of acetic acid are placed into a two-necked flask and stirred while heating at 80° C. in a flow of nitrogen. A mixture of 5 g of sulfuric acid and 15 g of acetic acid is dropped thereinto over 30 minutes. The obtained mixture is stirred while heating at 110° C. for 8 hours prior to cooling. The obtained reaction mixture is pored into 1.5 little of 5% of an aqueous solution of sodium hydrogencarbonate to precipitate a solid ingredient. After filtrating the precipitation, the precipitation is washed by warm water, 1 M of hydrochloric acid, and distilled water, respectively in this order. After heating the washed solid at 80° C. for 12 hours, unreacted starting materials are removed by stirring it in 50 mM of an aqueous solution of sodium hydroxide. Further, it is washed by distilled water, 1M of hydrochloric acid, and distilled water, respectively in this order and dried at 80° C. The obtained dried solid is powdered in a mortar to obtain 4.7 g of black solid powder as a final product.

EXAMPLE 2

Capacity of absorption of an absorbent made up of the polymer according to the present invention for divalent lead ion, zinc ion, copper ion, cobalt ion, nickel ion or trivalent iron ion is measured.

10 ml of aqueous solutions which have various pH values respectively and contain 0.1 mM divalent lead ion, zinc ion, copper ion, cobalt ion, nickel ion, or trivalent iron ion are prepared. Each of the prepared solution and 20 mg of the adsorbent obtained according to the manner shown in Example 1 are placed into a flask to shake it at 30° C. for five hours. And then, the adsorbent is removed by filtration and a concentration of the metal ion in the filtrate is measured. Using the obtained concentration and the initial concentration (0.1 mM), the capacity of adsorption of the adsorbent for each kind of metal ion is calculated according to the following equation to represent it by a percentage of adsorption.

$$[\text{percentage of adsorption}](\%) =$$
$$\frac{0.1 \text{ mM} - [\text{concentration of metal ion after adsorption}]}{0.1 \text{ mM}} \times 100$$

A relation between the obtained percentage of adsorption and pH value of the filtrate is plotted to obtain a graph shown in FIG. 1.

From FIG. 1, it can be found that iron and lead can be separated well from copper, zinc, nickel, and cobalt. Particularly at pH 3.4, lead is adsorbed at approximately 100%, on the other hand zinc is not adsorbed at all. From this, lead and zinc can be apparently separated from each other perfectly by using the adsorbent according to the present invention.

EXAMPLE 3

A saturation amount of adsorption of the adsorbent made up of the polymer according to the present invention for divalent lead ion is measured.

Figure 2:
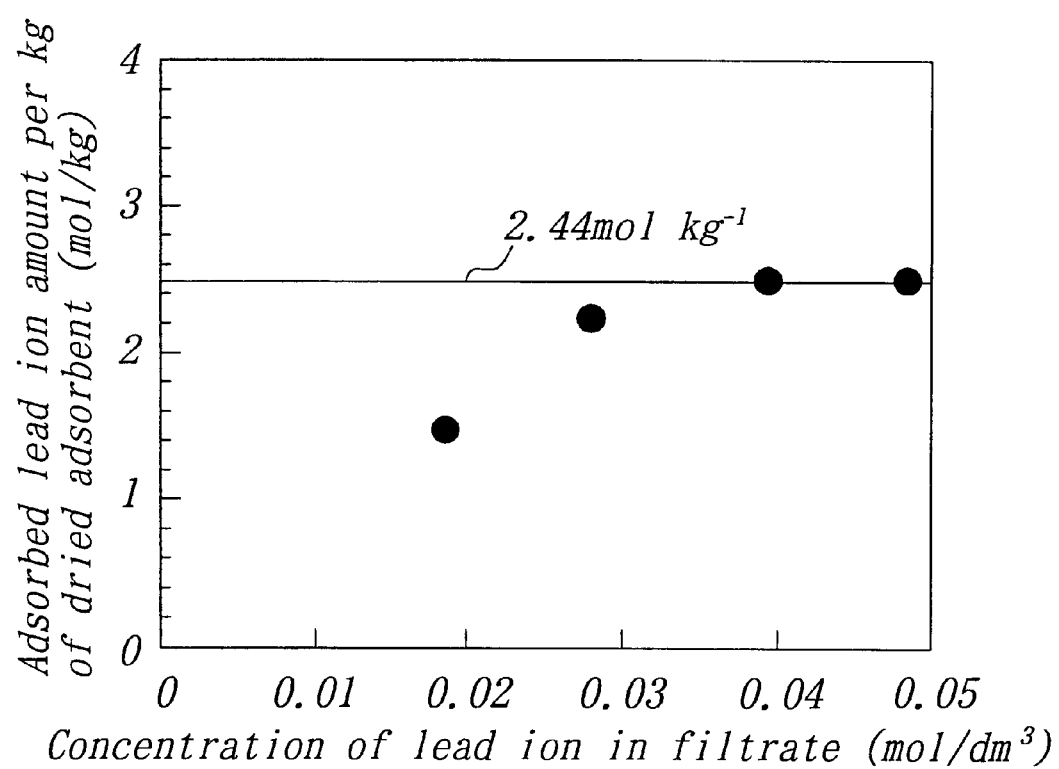
FIG. 2 is a graph showing a relation between an amount of divalent lead ions adsorbed and a concentration of the lead ions in a filtrate.

10 mg of the present adsorbent and 10 ml of aqueous solution at pH 3.5 containing 20–50 mM divalent lead ion are placed into a flask to shake them at 30° C. for five hours. Then, the adsorbent is separated by filtrating and a concentration of remaining metal ions in the filtrate is measured. From the concentration and the initial concentration (0.1 mM), a rate of adsorption for lead ion per kg of the dried adsorbent are calculated. A relation between the rate of adsorption and the concentration of remaining lead ion in the filtrate is shown by a graph in FIG. 2. From this graph, a saturation amount of adsorption of the present adsorbent for lead ion is found to be 2.44 mole/kg. This value is substantially the same as about 2 mole/kg of a rate of exchange of generally commercial ion exchange resin and when it is considered that lead ion is divalent metal ion, this value may be said to be a considerably large value. Further, this value is very large as compared with 0.62 mole/kg of a saturation amount of adsorption of the adsorbent obtained by fixing calixarene on polyallylamine according to an already filed application (JP-A-11-70383) by the present inventors.

EXAMPLE 4

A column packed with the adsorbent made up of the polymer according to the present invention is broke through by lead ions and zinc ions and then a faculty of separation for both kinds of metal ion is measured.

Figure 3:
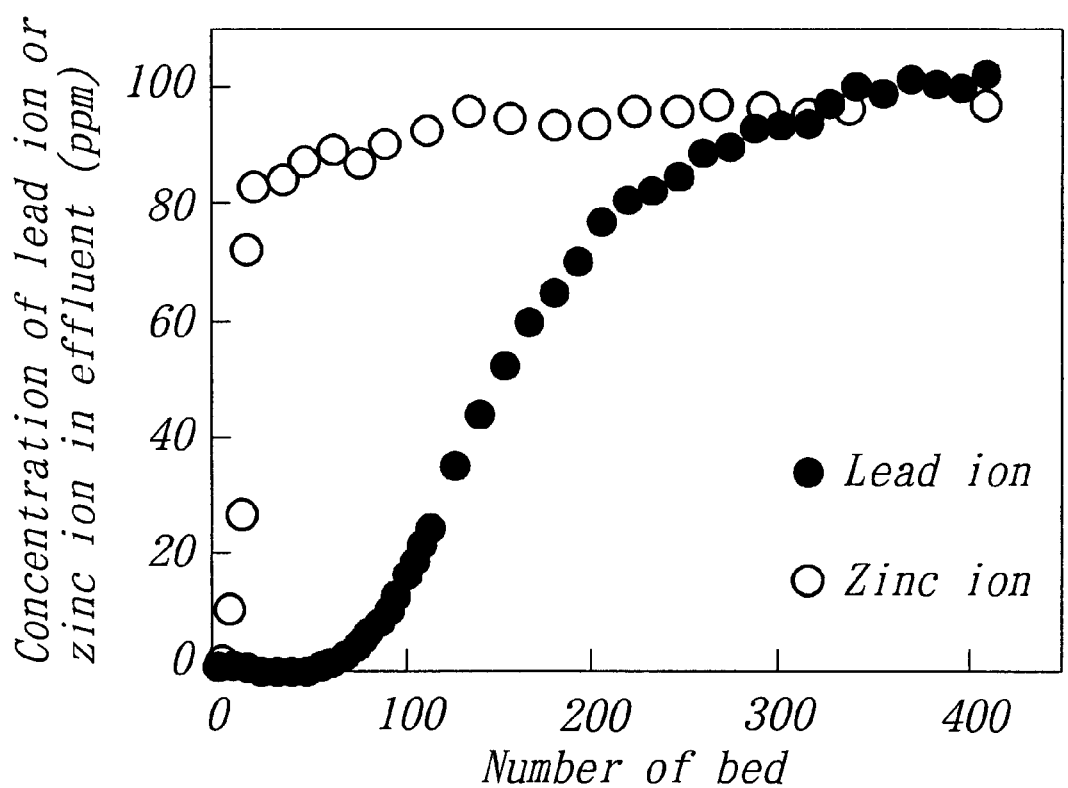
FIG. 3 is a graph showing a relation between concentrations of lead ion and zinc ion in an effluent and the number of bed.

0.10 g of the adsorbent is soaked in diluted hydrochloric acid at pH 3.0 for overnight and then the soaked adsorbent is packed into the column in sandwich style between glass beads at upper and lower portions. Hydrochloric acid at pH 3.0 containing 100 ppm of divalent lead ion and 100 ppm of zinc ion are passed through a column at a flow rate of 16.4 ml/h. A concentration of each kind of metal ion in the effluent is measured. The concentration value vs. the number of bed of the column (which is obtained by dividing a volume of the effluent stored by the time by a volume of the adsorbent packed into the column) are plotted to obtain a graph shown in FIG. 3.

From the graph, it can be found that since the lead ion is not contained in the effluent till about 50 of the number of bed, the lead ion can be separated from the zinc ion.

Figure 4:
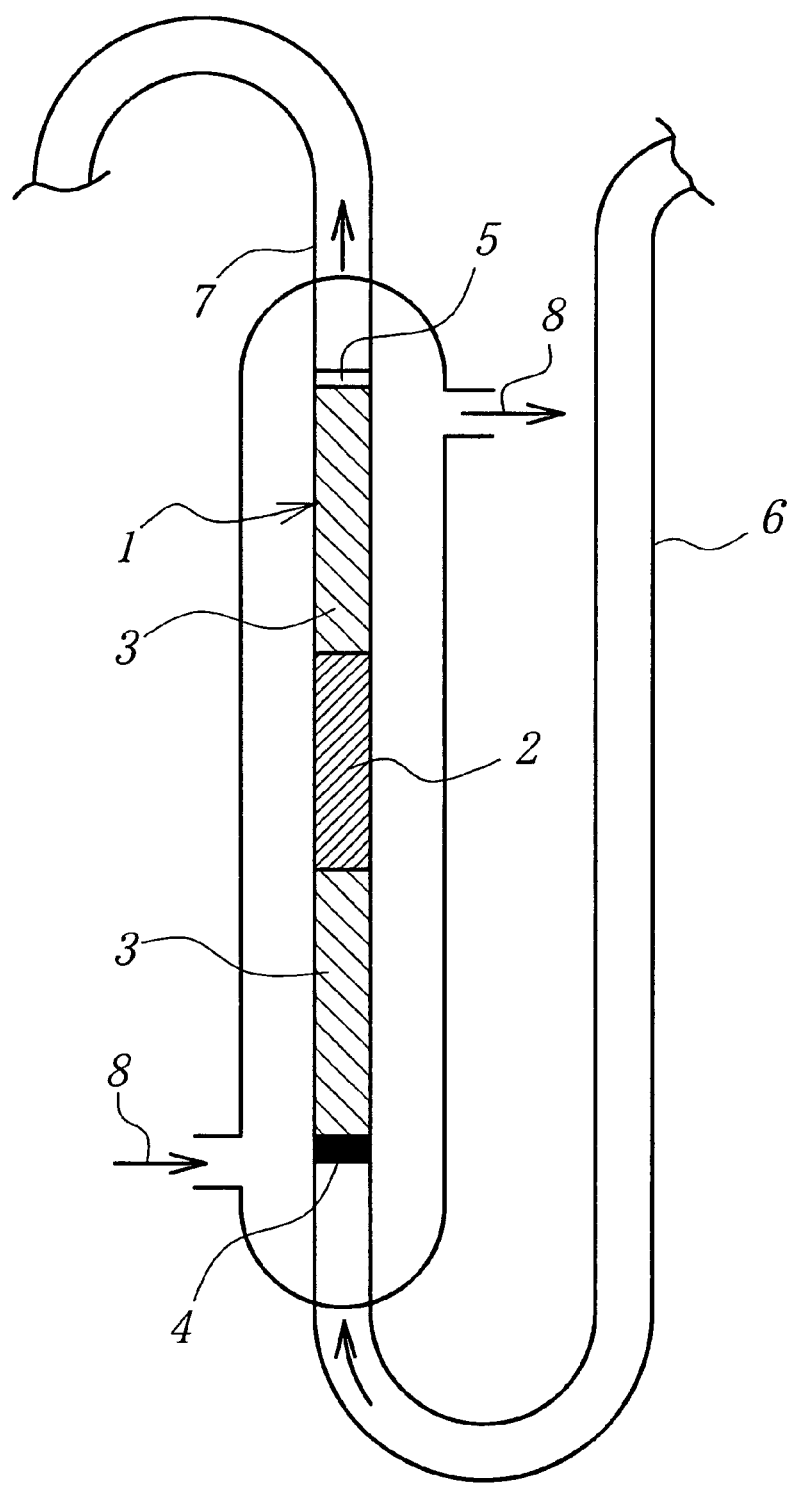
FIG. 4 is a schematic illustration showing an adsorption device.

Now, the outline of the treatment device used will be explained with reference to FIG. 4. The reference number 1 represents the adsorption column, the adsorbent 2 according to the present invention is sandwiched between glass beads 3 at upper and lower portion, further a glass filter 4 is placed at the lower portion thereof and a cotton 5 is placed at the upper portion. The liquid to be treated is supplied to the column 1 through a feed pipe 6 from a micro tube (not shown). And the effluent passed through the column 1 is recovered through a discharge pipe 7 by a fraction corrector (not shown). Further, the temperature of the column 1 is controlled by a constant temperature-water flowed in the direction shown by arrows 8.

EXAMPLE 5

A faculty of separation for lead ion and zinc ion is measured by passing an eluent through the column after through which lead ions and zinc ions are flowed till a breakthrough point.

Figure 5:
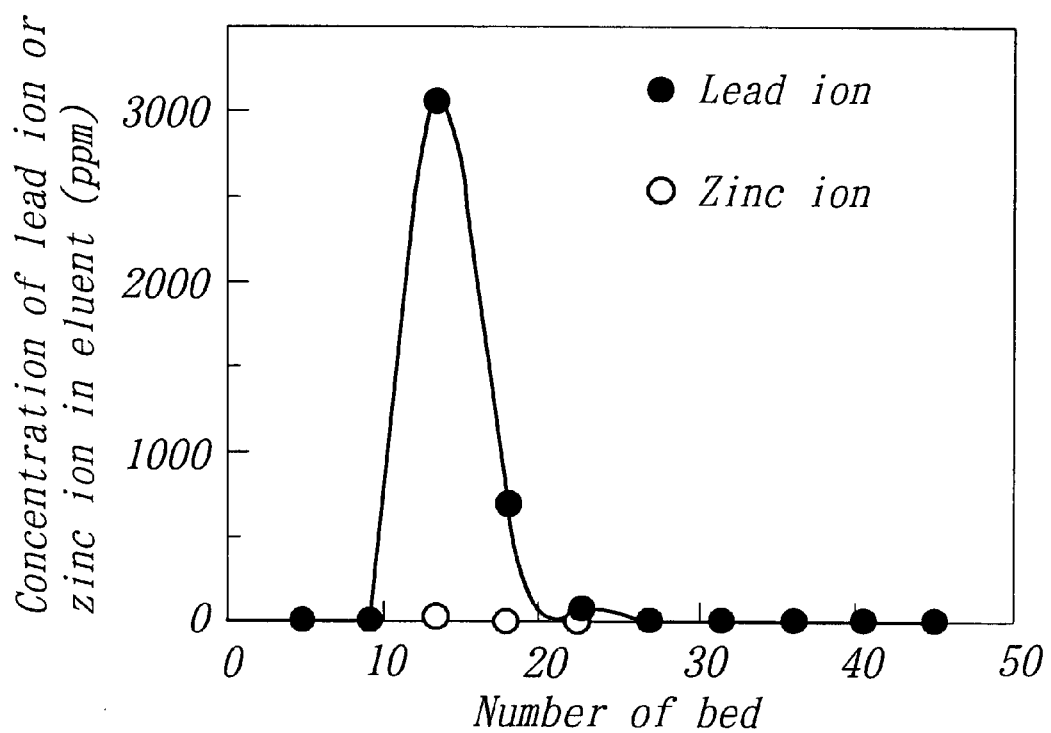
FIG. 5 is a graph showing a relation between concentrations of lead ion and zinc ion in an eluent and the number of bed.

After washing the column broke-through in Example 4 with water at pH 3.0, the metal ions adsorbed are eluted by 0.1 M hydrochloric acid at a rate of flow of 16.4 ml/h. A concentration of each kind of metal ion in the effluent is measured, by plotting the concentration value vs. the number of bed of the column a graph shown in FIG. 5 is obtained.

From the graph, it can be found that the zinc ions is little detected, whereas the lead ion is concentrated to not less than 30 times as compared with the untreated liquid before passing through the column.

From this, it is found that by using the column packed with the adsorbent according to the present invention, lead can be recovered at a high purity and concentration.

As explained above, the present invention can provide the adsorbent having an excellent faculty of separation for divalent lead ion, an easy preparation, and a low cost and the method of more effectively separating, removing, and recovering lead ion from an aqueous solution containing lead ion.

By using the adsorbent made up of the calix [4] arene polymer according to the present invention, a trace amount of lead ion can be separated and removed from a solution containing a large amount of zinc ion and a trace amount of lead ion, for example, a zinc plating liquid.

What is claimed is:

1. A calix [4] arene polymer which has a repeating unit shown by the following chemical formula

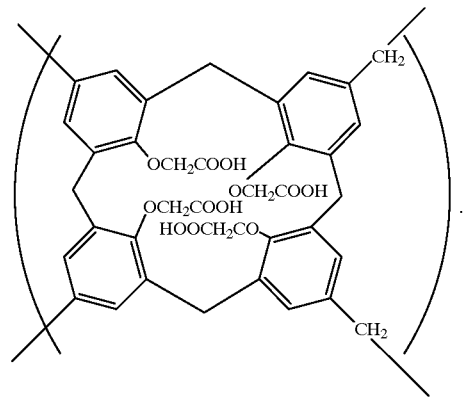

2. A method of manufacturing the calix [4] arene polymer according to claim 1, in which the method comprises the steps of mixing calix [4] arene shown by the following chemical formula, trioxane and acetic acid to stir them under heating, adding a mixture of sulfuric acid and acetic acid thereto to further stir them under heating, and after cooling, precipitating a product by adding sodium hydrogencarbonate thereinto

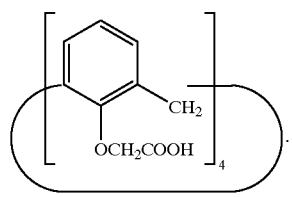
3. A method of separating divalent lead ions from an aqueous solution containing the divalent lead ions by contacting the calix[4]arene polymer according to claim 1 with the aqueous solution.
* * * * *